United States Patent [19]

Gajewski

[11] Patent Number: 5,895,806

[45] Date of Patent: Apr. 20, 1999

[54] POLYURETHANE COMPOSITION USEFUL FOR COATING CYLINDRICAL PARTS

[75] Inventor: Vincent John Gajewski, Cheshire, Conn.

[73] Assignee: Uniroyal Chemical Company, Inc., Middlebury, Conn.

[21] Appl. No.: 08/643,713

[22] Filed: May 6, 1996

[51] Int. Cl.⁶ .................................................. C08G 18/32
[52] U.S. Cl. ........................................... 528/60; 528/64
[58] Field of Search ...................................... 528/60, 64

[56] References Cited

U.S. PATENT DOCUMENTS

| | | | |
|---|---|---|---|
| 3,520,747 | 7/1970 | McGaughey | 156/153 |
| 3,646,651 | 3/1972 | McGaughey | 29/130 |
| 3,929,730 | 12/1975 | Graefe et al. | 260/77.5 AN |
| 4,267,299 | 5/1981 | Deschsle, III | 528/64 |
| 4,368,568 | 1/1983 | Watanabe | 29/130 |
| 4,571,798 | 2/1986 | Adams | 29/121.8 |
| 5,112,933 | 5/1992 | O'Donnell et al. | 528/61 |
| 5,504,145 | 4/1996 | Treasurer | 528/61 |

FOREIGN PATENT DOCUMENTS

| | | |
|---|---|---|
| 49985 | 4/1982 | European Pat. Off. . |
| 0239870 | 10/1987 | European Pat. Off. . |
| 0503755 | 9/1992 | European Pat. Off. . |
| 0650988 | 5/1995 | European Pat. Off. . |

OTHER PUBLICATIONS

Ruprecht et al, "Roll Covering by Rotational Casting with Fast–Reacting PUR Systems", Polyurethanes World Congress 1991, 478–481 (Sep. 24–26, 1991).

*Primary Examiner*—Erma Cameron
*Attorney, Agent, or Firm*—Daniel Reitenbach

[57] ABSTRACT

A polyurethane composition comprising:

a) an isocyanate-terminated polyurethane prepolymer; and b) a curative agent comprising i) a polyol; ii) an aromatic diamine; iii) a thixotropic aliphatic amine; and iv) a thixotropic colloidal additive. This composition is useful for coating cylindrical objects.

16 Claims, No Drawings

5,895,806

1

POLYURETHANE COMPOSITION USEFUL FOR COATING CYLINDRICAL PARTS

FIELD OF INVENTION

The present invention is related to a polyurethane composition useful for coating cylindrical objects. More particularly, the present invention is related to a polyurethane composition comprising an isocyanate-terminated polyurethane prepolymer and a curative mixture.

BACKGROUND OF THE INVENTION

A variety of elastomeric coverings can be used to coat rolls in applications in which the rolls require protection. Polyurethane elastomers are used as roll coatings in applications where abrasion and tear resistance, good load bearings characteristics, high hardness, and solvent resistance are required.

In steel mill applications, for example, large numbers of these rolls are used for guiding, tensioning, and otherwise engaging steel strip during rolling and pickling applications. The rolls are subjected to the strong chemical agents used for pickling and cleaning the strip. Similarly, in paper mills, polyurethane-coated metal rolls are used for supporting and conveying paper through high pressure nips of paper making machine assemblies such as press rolls, calendar stacks, and the like. The rolls used in paper mill operations require a protective cover whose thickness can be varied depending on the roll's anticipated use. Being able to control the thickness of the protective cover is, therefore, desirable.

Different methods have been developed for applying coatings to metal rolls. U.S. Pat. Nos. 3,520,747; 3,646,651; and 4,368,568 describe multistep methods for multilayer coating of rolls.

U.S. Pat. No. 4,571,798 describes a method wherein paper mill rolls are coated by spraying a quick-gelling polyurethane onto a core.

Ruprecht et al, Polyurethanes World Congress 1991 (Sep. 24–26, 1991), 478–481, describe rotational casting techniques useful for producing roll coverings using fast-reacting polyurethane elastomer systems. In these systems, the polyurethane reaction mixture is metered through a movable mixing head which travels at constant speed in the axial direction along the rotating roll core, a short distance above its surface. The polyurethane reaction mixture solidifies very quickly, in a matter of seconds, to produce a polyurethane coating with a thickness buildup of 4–5 mm. Additional layers of the polyurethane reaction mixture are applied until the desired thickness of polyurethane coating is achieved.

Rotational casting reduces the number of steps involved in roll coating. However, if the polyurethane reaction mixture gels too slowly, the polyurethane coating will drip off the roll. If the polyurethane reaction mixture is formulated to gel quicker, the polyurethane can gel in the head of the mixer or ridges can develop on the outer surface of the roll requiring machine finishing of the polyurethane coating on the surface of the roll.

Thickening agents, such as fumed silica, can be added to the polyurethane reaction mixture in a rotational casting procedure, to thicken the coating and eliminate dripping. However, the use of thickening agents alone can often result in the polyurethane reaction mixture becoming too thick to flow or in the polyurethane coating being applied in undesirable thicknesses.

It is therefore an object of the present invention to provide a new polyurethane composition useful for coating cylin-

2 drical objects. It is a further object of this invention to provide a polyurethane compostion which can be used in a rotational casting process.

SUMMARY OF THE INVENTION

This invention relates to a polyurethane composition comprising:

a) an isocyanate-terminated polyurethane prepolymer; and b) a curative agent comprising i) a polyol; ii) an aromatic diamine; iii) a thixotropic aliphatic amine; and iv) a thixotropic colloidal additive.

DETAILED DESCRIPTION OF THE INVENTION

For the purposes of this invention, the term "isocyanate-terminated polyurethane prepolymer" means the reaction product formed when an excess of an organic diisocyanate monomer is reacted with a polyol. Preferably, a stoichiometric excess of the diisocyanate monomer (an NCO:OH ratio greater than 2:1) is used.

For the purposes of this invention, a material is "thixotropic" if its addition to the polyurethane composition results in a composition whose viscosity lowers under shear and whose viscosity rises (thickens) in the absence of shear.

The organic diisocyanate monomer can be an aromatic or aliphatic diisocyanate. Useful aromatic diisocyanates can include, for example, 2,4-toluene diisocyanate and 2,6-toluene diisocyanate (each generally referred to as TDI), mixtures of the two TDI isomers, 4,4'-diisocyanato diphenylmethane (MDI), p-phenylenediisocyanate (PPDI), naphthalene-1,5-diisocyanate, diphenyl-4,4'-diisocyanate, dibenzyl-4,4'-diisocyanate, stilbene-4,4'-diisocyanate, benzophenone-4,4'diisocyanate, 1,3- and 1,4-xylene diisocyanates, and mixtures thereof. Preferred aromatic isocyanates for preparation of the polyurethane prepolymers of the present invention include MDI, TDI, and PPDI.

Useful aliphatic diisocyantes can include, for example, 1,6-hexamethylene diisocyanate, 1,3-cyclohexyl diisocyanate, 1,4-cyclohexyl diisocyanate (CHDI), the saturated diphenylmethane diisocyante (known as H(12)MDI), isophorone diisocyanate (IPDI), and the like. A preferred aliphatic diisocyanate is CHDI.

High molecular weight (MW) polyols useful in the preparation of the isocyanate-terminated polyurethane prepolymer have a number average molecular weight of at least about 250, e.g., polyether polyols or polyester polyols. The molecular weight of the polyol can be as high as, e.g., about 10,000 or as low as about 250. A molecular weight of about 650 to 3000 is preferred, with a molecular weight of 1000 being the most preferred.

A preferred high MW polyol is a polyalkyleneether polyol having the general formula $HO(RO)_nH$, wherein R is an alkylene radical and n is an integer large enough that the polyether polyol has a number average molecular weight of at least 250. Such polyalkyleneether polyols are well-known and can be prepared by the polymerization of cyclic ethers such as alkylene oxides and glycols, dihydroxyethers, and the like, using methods known in the art.

Another preferred high MW polyol is a polyester polyol. Polyester polyols can be prepared by reacting dibasic acids (usually adipic acid but other components such as sebacic or phthalic acid may be present) with diols such as ethylene glycol, 1,2-propylene glycol, 1,4-butylene glycol and diethylene glycol, tetramethylene ether glycol, and the like.

Polyols such as glycerol, trimethylol propane, pentaerthythritol, sorbitol, and the like, can be used if chain branching or ultimate cross-linking is desired. Some polyester polyols also employ caprolactone and dimerized unsaturated fatty acids in their manufacture. Another useful polyester polyol can be obtained by the addition polymerization of e-caprolactone in the presence of an initiator.

Other useful high MW polyols are those that have at least two hydroxyl groups and whose basic backbone is obtained by polymerization or copolymerization of such monomers as butadiene and isoprene monomers.

The high MW polyols can be used in combination with low MW polyols, i.e., polyols with an average molecular weight of less than 250. An aliphatic glycol is a preferred low MW polyol. Suitable aliphatic polyols include ethylene glycol, diethylene glycol, dipropylene glycol, neopentyl glycol, 1,3-butanediol, 1,4-butanediol, and the like. In general, the amount of the low MW polyol should be no more than about 20% of the combination of high MW polyol and low MW polyol. Preferably, the amount of low MW polyol is between about 0 to about 15% of the combination.

Particularly preferred polyols useful in the preparation of the isocyanate-terminated polyurethane prepolymer of this invention include polytetramethylene ether glycol (PTMEG), polypropylene glycol, and a dihydroxypolyester.

The isocyanate-terminated polyurethane prepolymer can be prepared by reacting the organic diisocyanate monomer with the polyol or polyol blend, in a mole ratio of organic diisocyanate monomer to polyol or polyol blend ranging from about 1.7:1 to about 12:1, depending on the diisocyanate monomer being used. For example, when the diisocyanate monomer is TDI, the preferred mole ratio of organic diisocyanate monomer to polyol is from about 1.7:1 to about 2.2:1. When the diisocyanate monomer is MDI, the preferred mole ratio of organic diisocyanate monomer to polyol is from about 2.5:1 to about 4:1.

The curative agent of the present invention comprises: i) a polyol; ii) an aromatic diamine; iii) a thixotropic aliphatic amine; and iv) a thixotropic colloidal additive.

The polyol useful in the curative agent can be any of those described above and can be the same or different than the polyol used in the preparation of the isocyanate-terminated polyurethane prepolymer. Preferred polyols for use in the curative agent include polytetramethylene ether glycol (PTMEG), polypropylene glycol, and a dihydroxypolyester. The polyol can be used in an amount from about 10 weight percent to about 90 weight percent of the total weight of the curative agent. A preferred amount of polyol will range from about 30 to about 60 weight percent of the total weight of the curative agent.

The aromatic diamine useful in the curative agent can be any aromatic diamine useful as a curative for polyurethane, such as, for example, 4,4'-methylene-bis-(2-chloroaniline), 2,2'5-trichloro-4,4'-methylenediamines, naphthalene-1,5-diamine, ortho, meta, and para-phenylene diamines, toluene-2,4-diamine, dichlorobenzidine, diphenylether-4,4'-diamine, including their derivatives and mixtures. Preferred aromatic diamines include 4,4'-methylene-bis-(3-chloro)aniline (MBCA), 4,4'methylene-bis-(3-chloro-2,6-diethyl)aniline (MCDEA), diethyl toluene diamine (DETDA), tertiary butyl toluene diamine (TBTDA), dimethylthio-toluene diamine (Ethacure™ 300 from Ethyl Corporation), trimethylene glycol di-p-aminobenzoate (Polacure™ 740 from Polaroid Corporation), and 1,2-bis(2-aminophenylthio)ethane (Cyanacure from American Cyanamid Company). Especially preferred aromatic diamines include Ethacure 300 and similar compounds. The aromatic amine is present in the curative agent in an amount ranging from about 10 weight percent to about 90 weight percent of the total weight of the curative agent. A more preferred range is from about 20 to about 80 weight percent.

The thixotropic aliphatic diamine can be any aliphatic diamine which reacts quickly with the isocyanate-terminated polyurethane, prepolymer and produces thixotropy in situ, in the polyurethane composition, such as, for example, alkyl diamines, ethylene polyamines, amine-terminated polyoxypropylenes, and amine-terminated polyoxyethylenes. Examples of aliphatic diamines include, for example, ethylene diamine, 1,6-hexanediamine, and 1,12-dodecanediamine. The aliphatic diamine can also be a cycloaliphatic diamine such as, for example, 1,4-cyclohexane diamine, isophorone diamine, and the like. The aliphatic diamine can also include ethylene polyamines such as diethylene triamine and triethylene tetramine, xylene diamine, piperazine, and, preferably, amine-terminated polyoxypropylenes such as the Jeffamine series of compounds (available from Texaco, Inc.). The aliphatic diamine or mixture of aliphatic diamines, is present in the curative agent in amounts ranging from about 0.1 weight percent to about 1.5 weight percent of the total weight of the curative agent. A more preferable range is from about 0.2 to 0.7 weight percent.

The thixotropic colloidal additive can be any thixotropic colloidal material which does not have deleterious effect on the polyurethane composition or on the composition's use as a coating material. Useful thixotropic colloidal additives can include, for example, fumed silicas, clays, bentonites, talcs, and the like. Clays are usually hydrated aluminum silicates. Bentonite is a type of colloidal clay, composed chiefly of montmorillonite. Talcs are hydrous magnesium silicates, which are also referred to as steatites or soapstone. Silica is a common name for silicon dioxide, $SiO_2$, which occurs in nature as sand, quartz, flint, and diatomite. A preferred thixotropic colloidal additive is a fumed silica sold under the trademark AEROSIL (Degussa, Inc.).

The thixotropic colloidal additive can be present in the curative agent in an amount of from about 1.0 weight percent to about 10 weight percent, based on the total weight of the curative agent. A more preferred range is from about 2 to about 5 weight percent.

The synergistic combination of the thixotropic aliphatic amine and the thixotropic colloidal additive in the polyurethane composition results in a polyurethane composition which flows effectively and resists undesirable dripping when the composition is used for rotational casting.

Preferably, the isocyanate-terminated polyurethane prepolymer can be mixed with the curative agent in amounts such that the total active hydrogen content of the curative agent is equal to about 80–115% of the total isocyanate content of the isocyanate-terminated polyurethane prepolymer. In a more preferred embodiment, the total active hydrogen content of the curative agent is equal to about 90–95% of the total isocyanate content of the isocyanate-terminated polyurethane prepolymer.

The polyurethane composition of this invention can be reacted, mixed, and applied at ambient temperatures and can be applied to the substrates to be coated without the need for molds. Use of the polyurethane composition of this invention in rotational casting results in minimal dripping and ridging of the coating on the rolls covered.

The examples that follow detail the compositions used in covering cylindrical objects with polyurethanes by rotational casting. Details of the equipment types and process steps used in rotational casting of rolls are described in Ruprecht et al. supra. The pot life, dripping, tolerance, and thickness/pass characteristics of the tested polyurethane compositions, are shown in Table 1. The physical properties of the tested polyurethane coatings on the rolls, including durometer, 100% modules, tensile strength, elongation, and tear strength, are shown in Table 2.

EXAMPLES

The following Examples are provided to illustrate the present invention.

EXAMPLE 1

Preparation of Isocyanate-Terminated Polyurethane Prepolymer:

An isocyanate-terminated polyurethane prepolymer was prepared by reacting 3.5 moles of MDI with 1 mole of a 1000 MW PTMEG polyol for three hours at 75° C. in a 3 neck, 3 liter, round bottom flask equipped with a stirrer, nitrogen inlet, and heating mantel. The resulting isocyanate content was measured by the dibutylamine method as described in ASTM D1638, to be 11.25% by weight.

EXAMPLE 2

Preparation of Curative Agent

A curative agent was prepared by mixing, in a beaker at 25° C. for 10 minutes, a) a PTMEG polyol of 650 MW; b) a blend of the aromatic amines DETDA and DMTDA, and the aliphatic amine Jeffamine™ T-403 (Jeffamine™ T-403 is an amine-terminated polyoxypropylene triol of 400 MW sold by Texaco Inc.); and c) the fumed silica Aerosil 200, in a weight ratio of 37.9 PTMEG to 38.2 DETDA to 21.1 DMTDA to 2.5 Aerosil to 0.3 Jeffamine.

EXAMPLE 3

Preparation of the Polyurethane Composition Suitable for Rotational Casting

The isocyanate-terminated polyurethane prepolymer prepared in Example 1 was mixed with the curative agent prepared in Example 2 at a temperature of 25° C., on a Mark X meter/mix machine at a weight ratio of 100 to 35, respectively, resulting in a mixture with an active hydrogen to isocyanate ratio of 95%. The mixture was then dispensed onto a rotating roll core.

Three different comparative curative agents were prepared and mixed with the prepolymer of Example 1 as described in Example 3. In Comparative Example A, the curative agent was prepared as described in Example 2 except that the Jeffamine™ T-403 was not included. In Comparative Example B, the curative agent was prepared as described in Example 2 except that the Aerosil 200 was not included. In Comparative Example C, the curative agent was prepared as described in Example 2 except that both Jeffamine™ T-403 and Aerosil 200 were not included.

TABLE 1

| Example | 3 | A | B | C |
|---|---|---|---|---|
| Pot Life, seconds | 24 | 27 | 24 | 26 |
| Dripping | None | Yes | Some | Excess |

TABLE 1-continued

| Example | 3 | A | B | C |
|---|---|---|---|---|
| 1-inch Tolerance | ±0.050 | ±0.050 | ±0.075 | ±0.050 |
| Thickness/pass (inch) | 0.225 | 0.175 | 0.170 | 0.085 |

Use of the composition of Example 3 resulted in no dripping and a significantly improved thickness per pass compared to the compositions of the three Comparative Examples. Surprisingly, use of the fast-curing aliphatic amine Jeffamine™ T-403 in the composition of Example 3 did not result in reduced pot life. Similarly, the 1-inch tolerance was not adversely effected by the addition in-situ of Jeffamine™ T-403 and Aerosil 200 in the composition of Example 3, indicating the absence of the ridging problems often found in prior methods of roll coating.

Table 2 below compares the properties of the polyurethane prepared in Example 3 with the polyurethanes prepared in Comparative Examples A, B and C. As can be seen in Table 2, the physical properties of the polyurethane produced from the polyurethane composition of this invention was comparable to polyurethanes cured by conventional curatives.

TABLE 2

| Example | 3 | A | B | C |
|---|---|---|---|---|
| Durameter, Shore D | 67 | 67 | 67 | 67 |
| 100% Modulus, psi | 3800 | 3800 | 3800 | 3850 |
| Tensile strength; psi | 6300 | 6300 | 6300 | 6300 |
| Elongation, % | 190 | 200 | 170 | 200 |
| Tear, die C, pli | 830 | 790 | 750 | 750 |
| Tear, split, pli | 150 | 140 | 130 | 140 |

What is claimed is:

1. A polyurethane composition comprising:
   a) an isocyanate-terminated polyurethane prepolymer; and
   b) a curative agent comprising i) a polyol; ii) an aromatic diamine; iii) a thixotropic aliphatic amine; and iv) a thixotropic colloidal additive.

2. A polyurethane composition as recited in claim 1 wherein the isocyanate-terminated polyurethane prepolymer is a reaction product of a polyol and an organic diisocyanate monomer selected from the group consisting of 2,4-toluene diisocyanate, 2,6-toluene diisocyanate, mixtures of 2,4-toluene diisocyanate and 2,6-toluene diisocyanate, 4,4'-diisocyanato diphenylmethane (MDI), p-phenylene-diisocyanate (PPDI), naphthalene-1,5-diisocyanate, diphenyl-4,4'-diisocyanate, dibenzyl-4,4'-diisocyanate, stilbene-4,4'-diisocyanate, benzophenone-4,4'-diisocyanate, 1,3-diisocyanate, 1,4-xylene diisocyanate, 1,6-hexamethylene diisocyanate, 1,3-cyclohexyl diisocyanate, 1,4-cyclohexyl diisocyanate (CHDI), diphenylmethane diisocyanate (H(12)MDI), and isophorone diisocyanate (IPDI).

3. A polyurethane composition as recited in claim 2 wherein the organic isocyanate monomer is selected from the group consisting of CHDI, MDI, TDI, and PPDI.

4. A polyurethane composition as recited in claim 1 wherein the isocyanate-terminated polyurethane prepolymer is a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and a dihydroxypolyester.

5. A polyurethane composition as recited in claim 4 wherein the isocyanate-terminated polyurethane prepolymer is a reaction product of an organic diisocyanate monomer and PTMEG.

6. A polyurethane composition as recited in claim 1 wherein the curative agent comprises a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and a dihydroxypolyester.

7. A polyurethane composition as recited in claim 1 wherein the curative agent comprises an aromatic amine selected from the group consisting of 4,4'-methylene-bis-(3-chloro)aniline (MBCA), 4,4'methylene-bis-(3-chloro-2,6-diethyl)aniline (MCDEA), diethyl toluene diamine (DETDA), tertiary butyl toluene diamine (TBTDA), dimethylthio-toluene diamine, trimethylene glycol di-p-aminobenzoate, 1,2-bis(2-aminophenylthio)ethane, 4,4'-methylene bis(2-chloroaniline), 2,2'5-trichloro-4,4'-methylene-diamine, naphthalene-1,5-diamine, ortho-phenylene diamine, meta-phenylene diamine, para-phenylene diamine, toluene-2,4-diamine, dichlorobenzidine, diphenylether-4,4'-diamine, and mixtures thereof.

8. A polyurethane composition as recited in claim 1 wherein the curative agent comprises a thixotropic aliphatic amine selected from the group consisting of ethylene diamine, 1,6-hexanediamine, 1,12-dodecane diamine, 1,4-cyclohexane diamine, isophorone diamine, diethylene triamine, triethylene tetramine, amine-terminated polyoxypropylenes, xylene diamine, and piperazine.

9. A polyurethane composition as recited in claim 1 wherein the curative agent comprises a thixotropic colloidal additive selected from the group consisting of fumed silica, clay, bentonite, and talc.

10. A polyurethane composition as recited in claim 1 wherein the isocyanate-terminated polyurethane prepolymer is prepared by reacting an organic diisocyanate monomer with a polyol, in a mole ratio of organic diisocyanate monomer to polyol ranging from about 1.7:1 to about 12:1.

11. A polyurethane composition as recited in claim 10 wherein the isocyanate-terminated polyurethane prepolymer is prepared by reacting TDI with a polyol in a mole ratio of TDI to polyol ranging from about 1.7:1 to about 2.2:1.

12. A polyurethane composition as recited in claim 10 wherein the isocyanate-terminated polyurethane prepolymer is prepared by reacting MDI with a polyol in a mole ratio of MDI to polyol ranging from about 2.5:1 to about 4:1.

13. A polyurethane composition as recited in claim 1 wherein the total active hydrogen content of the curative agent is equal to about 80–115% of the total isocyanate content of the isocyanate-terminated polyurethane prepolymer.

14. A polyurethane composition as recited in claim 13 wherein the total active hydrogen content of the curative agent is equal to about 90–95% of the total isocyanate content of the isocyanate-terminated polyurethane prepolymer.

15. A polyurethane composition as recited in claim 1 comprising a) an isocyanate-terminated polyurethane prepolymer prepared by reacting an organic diisocyanate monomer with a polyol, in a mole ratio of organic diisocyanate monomer to polyol ranging from about 1.7:1 to about 12:1; and b) a curative agent comprising i) about 10 weight percent to about 90 weight percent of a polyol; ii) about 10 weight percent to about 90 weight percent of an aromatic diamine; iii) about 0.1 weight percent to about 1.5 weight percent of a thixotropic aliphatic amine; and iv) about 1.0 weight percent to about 10 weight percent of a thixotropic colloidal additive, wherein the total active hydrogen content of the curative agent is equal to about 80–115% of the total isocyanate content of the isocyanate-terminated polyurethane prepolymer.

16. A polyurethane composition as recited in claim 15 comprising a) an isocyanate-terminated polyurethane prepolymer prepared by reacting an organic diisocyanate monomer with a polyol, in a mole ratio of organic diisocyanate monomer to polyol ranging from about 1.7:1 to about 4:1; and b) a curative agent comprising i) about 30 to about 60 weight percent of a polyol; ii) about 20 to about 80 weight percent of an aromatic diamine; iii) about 0.2 to 0.7 weight percent of a thixotropic aliphatic amine; and iv) about 2 to about 5 weight percent of a thixotropic colloidal additive, wherein the total active hydrogen content of the curative agent is equal to about 90–95% of the total isocyanate content of the isocyanate-terminated polyurethane prepolymer.

\* \* \* \* \*